United States Patent
Kahvecioglu et al.

(10) Patent No.: US 11,296,313 B2
(45) Date of Patent: Apr. 5, 2022

(54) CARBON DIOXIDE TREATMENT OF CATHODES

(71) Applicant: UCHICAGO ARGONNE, LLC, Chicago, IL (US)

(72) Inventors: Ozgenur Kahvecioglu, Naperville, IL (US); Gregory K. Krumdick, Homer Glen, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 742 days.

(21) Appl. No.: 15/960,178

(22) Filed: Apr. 23, 2018

(65) Prior Publication Data

US 2019/0326591 A1   Oct. 24, 2019

(51) Int. Cl.

| | |
|---|---|
| H01M 4/36 | (2006.01) |
| C01G 53/00 | (2006.01) |
| C01D 15/08 | (2006.01) |
| H01M 4/58 | (2010.01) |
| H01M 4/505 | (2010.01) |
| H01M 10/0525 | (2010.01) |
| H01M 4/525 | (2010.01) |
| H01M 4/02 | (2006.01) |

(52) U.S. Cl.
CPC ............ *H01M 4/366* (2013.01); *C01D 15/08* (2013.01); *C01G 53/50* (2013.01); *H01M 4/505* (2013.01); *H01M 4/525* (2013.01); *H01M 4/5825* (2013.01); *H01M 10/0525* (2013.01); *C01P 2004/80* (2013.01); *C01P 2006/40* (2013.01); *H01M 2004/028* (2013.01)

(58) Field of Classification Search
CPC .................................................. H01M 4/366
See application file for complete search history.

(56) References Cited

U.S. PATENT DOCUMENTS

| | | | |
|---|---|---|---|
| 5,470,448 A | 11/1995 | Moler et al. | |
| 9,614,226 B2 | 4/2017 | Paulsen et al. | |
| 2014/0087270 A1 | 3/2014 | Yoshida | |
| 2018/0183047 A1* | 6/2018 | Sakamoto | .............. C01G 53/54 |

FOREIGN PATENT DOCUMENTS

KR   20170078892 A  *  7/2017

OTHER PUBLICATIONS

KR-20170078892-A Original and Translation from Espacenet (Year: 2017).*

(Continued)

*Primary Examiner* — Nathanael T Zemui
(74) *Attorney, Agent, or Firm* — Cherskov Flaynik & Gurda, LLC

(57) ABSTRACT

A method for producing water resistant cathodes is discussed. The method uses mixing cathode powder with solid carbon dioxide to create a mixture and heating the mixture to a temperature. The heating occurs for a time sufficient to cause lithium carbonate coatings to form on the powder. A method for coating lithium-containing cathode surfaces is also discussed. This method uses simultaneously sublimating solid $CO_2$ and condensing atmospheric water vapor onto surfaces. Afterwards allowing the lithium to react with the sublimated $CO_2$ for a time sufficient to create a lithium carbonate film on the surface.

18 Claims, 2 Drawing Sheets

(56) References Cited

OTHER PUBLICATIONS

Arundel et al.; "Indirect Health Effects of Relative Humidity in Indoor Environments"; Environmental Health Perspectives vol. 65, pp. 351-361, 1986 (Year: 1986).*
H.A. Mosqueda, et al., "Chemical Sorption of Carbon Dioxide (CO2) on Lithium Oxide (Li2O)", Chemical Matter., vol. 18, No. 9, 2006, pp. 2307-2310.
Juergen Bernard, et al., "Formation and Stability of Bulk Carbonic Acid (H2Co3) by Protonation of Tropospheric Calcite," ChemPhysChem 2012, 13, pp. 3087-3091.

* cited by examiner

CARBON DIOXIDE TREATMENT OF CATHODES

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to cathode particle surface treatments, and more specifically, this invention relates to a method for improving water stability of cathodes to enable aqueous-based electrode manufacturing.

2. Background of the Invention

Lithium-ion cathode materials are processed into electrode laminates by using solvent based slurry coatings, such solvents including N-methylpyrrolidone (NMP). Typically, cathode powders are pressed or otherwise calendered into laminates onto current collectors and dried. Then the laminates are punched out as cathode-electrodes which are then built into batteries. This process is costly given the high boiling point of the hazardous solvent being used. Recovery of the solvent involves a highly expensive process.

Further, the production time of the finished laminates is lengthy, often exceeding 24 hours.

Lithium content ranges between 6.8 and 8.5 weight percent in cathode materials. Typical cathode substrate is a powdery metal oxide material. It is produced by mixing stoichiometric amounts of $NiMnCo(OH)_2$ with $LiOH \cdot H_2O$ (dry mixing). A solid state reaction occurs at high temperature (e.g., calcined at between 780-1000° C.) where all hydroxides are decomposed/oxidized to a metal oxide structure under air or oxygen flows.

Lithium diffuses inside the NiMnCo oxide matrix with the resulting structure losing all of its water during this conversion. While lithium diffuses to the core of the particle, diffusion naturally also occurs toward its surface. This surface lithium interacts with ambient environment components (like air, water). It is this surface Lithium that creates impurities on the cathode particle surfaces and these impurities (once formed) cause instabilities in water.

Electrode manufacturing is trending towards the use of waterborne binders. One process employs coating $Li_2CO_3$ onto cathode particles using water. Additional lithium salts are added and converted under $CO_2$ flux. This is a 5 step process which takes 2-3 days.

Another water-based system uses surface conversion whereby cathode particles are exposed to humid air (or $CO_2$ gas) for at least 1 month, and preferably 3 months.

The aforementioned state of the art processes are very time dependent due to slow reaction rates.

Continuous coating technology (e.g., electrophoretic coating) is currently being investigated to manufacture the electrodes in low viscosity aqueous bath compositions. In the aqueous based cathode electrode making process (e-coat); the main solvent is water. The cathode particles are encapsulated in micelles and suspended in the e-coat bath. These micelles (including cathode particles with binders and carbon) are charged particles (for example negatively charged) and under anodic e-coat they migrate towards positively charged anode (Aluminum) where they deposit. However, water damages the cathode particles, in particular cathode particles comprising nickel, cobalt, and manganese (NMC), due to high lithium ion dissolutions.

Aqueous base technologies suffer from the particles being unstable in water. As noted supra, element dissolutions occur from the cathode over time.

When lithium dissolves, there are many lithium ions in the electrolyte (e-coat bath). Lithium is very active electronegatively, so it can oxidize any metal surface which is more electropositive than it. For example, lithium ions (under anodic e-coat process) attack the aluminum current collector and oxidize its surface (a process called passivation). Once the aluminum surface is passivated, there will be a surface resistance on it, which will reduce the transportation of electric current homogeneously throughout the aluminum surface. As such, charged cathode particles (micelles) cannot attach to the surface of aluminum due to the insulating aluminum oxide layer. The charged particles cannot find any oppositely charged surfaces with which to deposit. (Aluminum metal typically serves as the anode in the e-coat process, whereon it is intended for charged cathode powders to deposit.)

In summary, when lithium dissolves from the cathode surface, it creates ionic barriers in the e-coat bath. These barriers necessitate the need for higher current so as to force the micelles to migrate towards aluminum. In addition, if the conductivity of e-coat bath is high due to lots of lithium ions creating ionic barrier, then the utilization/kinetics of electrophoretic deposition will reduce.

A barrier free clear pathway for particles to reach the aluminum surface at the minimum energy input (anodic current) remains elusive. As such, the anodic deposition current density (e.g.; $mA/cm^2$) needs to be increased to increase the loading, to bypass the barrier effect, which is blocking the charged particles to go to be deposited. But increasing the anodic current density also increases the anodization (passivation) of the aluminum surface comprising the current collector.

The cathode comprising micelles are deposited on an aluminum surface (the current collector) under anodic current applications, wherein the main anodic reaction is a water-splitting reaction which generates $H^+$ ions (local pH decrease=acidity). $O_2$ gas is also generated at the anode surface. This causes the following affects:

When cathode active materials are exposed to water, the pH of the slurry becomes very alkaline due to the proton exchange ($Li^+/H^+$), as lithium dissolves from the cathode structure. These high pH values for the slurry adversely affects the electrophoretic deposition process (e-coat). Also, the high pHs cause the aluminum current collector (i.e., the aluminum based cathode powder support) surfaces to oxidize, as discussed supra, further inhibiting conductance. Meanwhile, at the anode surface the local pH at the Al-anode/electrolyte interface is very low due to the aforementioned water splitting reaction generating $H^+$ ions. E-coating processes already start with high pH (due to the lithium leaching out from cathode surface=proton exchange; $Li^+/H^+$). So the cathode particles in the e-coat bath experience both too high a pH (up to ≥11) and too low a pH (down to ≤3). This causes damage to the particles.

Many anionic (e.g. polymer based) and cationic (metal based) coatings have been proposed but none of those mitigate the problem.

$Li_2CO_3$ is slightly soluble in water. A $Li_2CO_3$ coating on cathodes has been pursued as a way to protect the electrode surface from water-based reactants and electrolytes. State of the art aqueous coating methods create an add-on lithium carbonate layer over cathode particles via heat treatment wherein $CO_2$ gas is applied to powdery cathode materials. This results in a weak exposure of the carbon dioxide to all cathode surfaces. Since the heat treatment is typically a batch process (where the cathode powder depth of loading onto a support is stationary), and $CO_2$ is a gas, the top portion of the powder loadings is exposed to $CO_2$ while the inner portion is less so. This creates heterogeneities in the surface conversion, therefore requiring agitation during CO2 exposure to facilitate homogeneous conversion on all surfaces. Such agitation means are an added expense.

State of the art protocols encompass two phases. For example, $LiOH \cdot H_2O$ is dissolved in water and cathode particles are added to this solution to create a mixture that is stirred for a minimum of five hours. The water content is evaporated without filtering (e.g., vacuum drying for at least 12 hours), resulting in LiOH-coated cathode particles as a first phase. These particles are heat treated under $CO_2$ flow (usually in a furnace) for 2-3 hours. This process generates a $Li_2CO_3$ layer over the cathode particle as the second phase. However, inasmuch as water is super abundant, this process also causes the particles to deteriorate before the final coating is established.

The $Li_2CO_3$ coated particles, when soaked in water, cause stable but high pH values, along with high ionic conductivity, for the slurry bath. This fundamentally affects the electrophoretic deposition process (e-coat). Lithium dissolution from the cathode surface and from the added $Li_2CO_3$ coating occurs during water soaking. Higher conductivity of the bath results, and this adversely affects the migration as well as the adherence of charged cathode particles (micelles) on aluminum current collector surfaces. E-coat efficiencies suffer inasmuch as efficient e-coat requires less conductivity of the e-coat bath and lower pH values.

In hot and humid environments utilized by state of the art carbon dioxide treatment protocols, $H_2CO_3$ (carbonic acid) is not stable but directly decomposes back to $CO_2$ and $H_2O$. (This is akin to opening a soda can. The $CO_2$ evaporates from the soda in an irreversible process and this results in the pH lowering effect of $CO_2$ also disappearing.)

Humid conditions facilitate dissolving of lithium on the surface, thereby creating LiOH and with the air (or $CO_2$ gas) provided. Then, the LiOH converts to $Li_2CO_3$. This conversion requires a minimum of 1 month and up to 1 year of exposure, thereby rendering it unreasonably slow for production purposes. State of the art protocols can not generate stable carbonic acid in a hot and humid environment.

A need exists for a one phase method to mitigate elemental dissolutions from cathode particles during aqueous-based processing. ("One phase" is construed herein as all solid reactants.) The method should employ nonhazardous and low boiling point reagents to minimize cost. Also, the method should protect the cathode surface from chemical attack in aqueous liquors so as to minimize element dissolution. Otherwise, the higher ionic conductivity of the e-coat bath reduces the e-coat kinetics (particles do not adhere to the Al-current collector). Any method should employ a lower e-coat bath conductivity for more efficient e-coat deposition kinetics that are not affected by bath formulations. The coating should be compatible with aqueous based manufacturing processes and lastly facilitate the transfer of lithium ions during cycling.

SUMMARY OF INVENTION

An object of the invention is to provide a system and method for generating a water stable layer/coating/moiety on cathode particle surfaces to be processed in waterborne, more specifically, water-based electrode manufacturing systems for lithium-ion batteries that overcomes many of the drawbacks of the prior art Another object of the invention is to provide a non-aqueous-based system and method for producing water stable cathode particles to be used in aqueous based electrode manufacturing of lithium-ion batteries. A feature of the invention is exposing a cathode surface containing impurities to solid carbon dioxide for a time and at a temperature sufficient to convert the impurities to a lithium carbonate coating. An advantage of the invention is that the lithium carbonate coating confers protection to the cathode during water exposure associated with battery manufacture.

Still another object of the invention is to provide water stable cathode particles for use in a continuous anodic electrophoretic deposition process to manufacture positive (cathode) electrodes for lithium-ion batteries. A feature of the invention is combining cathode powder with only solid carbon dioxide (i.e., sans carbon dioxide gas) to coat the cathode material. An advantage of the invented method is that entire exterior surfaces of the cathode particles are contacted with carbon dioxide. Another advantage is that water is not added to the process, thus facilitating a low pH reaction at the surface of the powder. This enhances electrophoretic kinetics of the reaction by minimizing elemental dissolutions.

Yet another object of the present invention is to provide a solid-state method for producing cathodes. A feature of the method is that no carbon dioxide gas or liquid water is added to the reaction liquor such that the cathode materials are not wetted with water. An advantage of the method is that protracted (several weeks or months) exposure to humid environments in controlled environments is not required to create lithium carbonate layers on cathode particle surfaces that could operate in aqueous environments.

Another object of the present invention is to provide a method for producing cathodes which operate in aqueous based environments. A feature of the method is converting already existing lithium ions and lithium salts inherent with cathode materials into a water-resistant coating covering the cathode materials. An advantage of the invention is that, unlike prior art protocols, additional lithium is not added to the cathode surface, which would otherwise adversely affect cathode performance. Rather, the existing in situ lithium is utilized to produce nanometer thickness (between 1 nm and 10 nm) layers of lithium carbonate.

Still another object of the present invention is to optimize current collector coating aqueous based protocols. A feature of the invention is converting in situ LiOH on cathode particle surfaces to a lithium carbonate film. An advantage of the invention is that water formation and uptake by cathode powers is eliminated or greatly diminished.

Briefly the invention provides a method for producing water resistant cathodes, the method comprising mixing dry cathode powder with solid carbon dioxide to create a mixture; and heating the mixture to a temperature and for a time sufficient to cause lithium carbonate coatings to form on the powder. These coated powders then may be pressed into a monolith or laminated onto a current collector for final use in a battery.

Also provided is a method for coating lithium-containing cathode surfaces, the method comprising simultaneously sublimating solid $CO_2$ and condensing atmospheric water vapor onto the surfaces; and allowing the lithium to react with the sublimated $CO_2$ for a time sufficient to create a lithium carbonate film on the surface.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
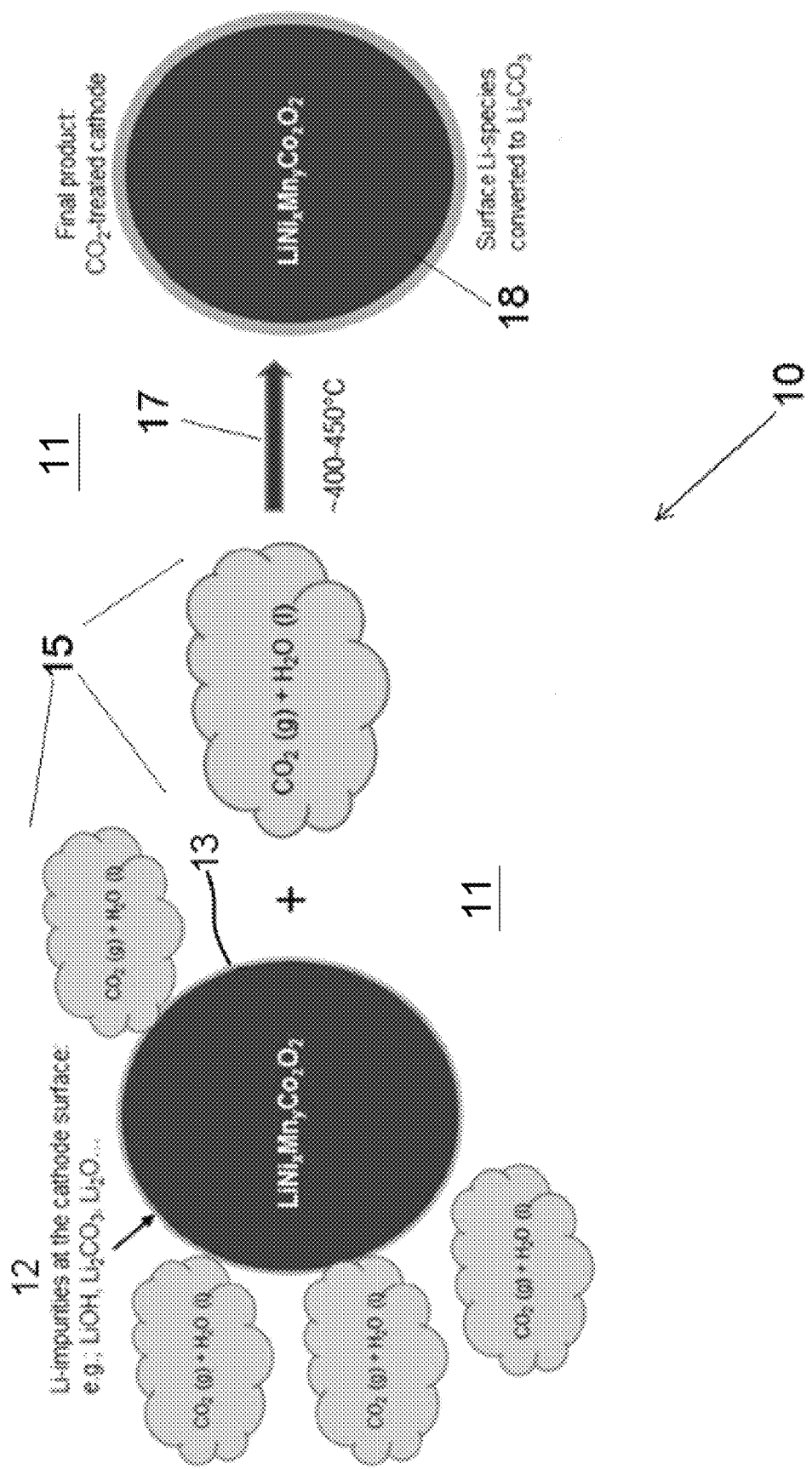
FIG. 1 is a schematic view of the invented process, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This invention comprises a quick and economical method to create surface lithium carbonate without exposing the cathode materials to the water prevalent in state of the art surface modification methodologies. To protect the surface from water attack, the surface of the cathode materials are treated such that the coating formed thereon protects the elements from dissolution. The coating is also compatible with state of the art manufacturing process and allows lithium ions to transfer during cycling when built into batteries.

The invention is a solid state method for producing carbonate coatings on cathodes. Generally, cathode material is subjected to cold substrate in ambient atmosphere. This cold substrate causes water vapor in the atmosphere to condense on the surface of the cathode material, perhaps even forming a film of ice. When the cold substrate is dry ice (or applied simultaneously with $CO_2$), carbonic acid also forms on the cathode surface. This carbonic acid reacts with the ionized lithium to form lithium carbonate coatings. No solvent is required in this otherwise solid state process.

This collection of water on the cathode surfaces solubilizes and otherwise dissolves lithium which originally exists in the cathode material. A salient advantage of the invented method is its leveraging of these in situ lithium moieties (either as just liberated lithium ions, hydroxides or just formed carbonates). This results in the in situ lithium dissolving in two steps, generating both the hydroxyl and carbonate products simultaneously. As such, the alkaline hydroxyl moieties immediately react with the acidic carbonate moieties, thereby providing a buffer of sorts at the cathode surface by modulating the pH. Also, the immediate removal or take up of LiOH minimizes water uptake by the cathode powders.

FIG. 1 is a schematic view of the overall invented method, designated as numeral 10. A cathode particle 12 is provided. Inherent with that particle are a myriad of impurities including LiOH, and $Li_2CO_3$. The particles 12 are mixed, buried, contacted, or otherwise interact with dry ice 15. That interaction causes the simultaneous generation of CO2 gas and water condensation at the particle's surface 13. This reaction mix is then subjected to a heating step 17 to create a composite particle 18.

The reaction atmosphere, designated in FIG. 1 as a numeral 11, may be ambient or controlled (closed, semi-sealed or sealed), as discussed infra. For example, the atmosphere 11 may be defined by the physical dimensions of a heated reaction chamber or furnace.

A myriad of benefits result from using solid $CO_2$ as the carbon dioxide source, those benefits including the following:

Decreases reaction rate from 48 hours to 6 hours, so an eight fold decrease. Also, it reduces the number of reaction steps from 5 to 2;

Eliminates the need of additional lithium salts to be deposited prior to $CO_2$ treatment. Rather, contacting solid cathode surfaces with solid carbon dioxide provides a means for leveraging in situ original surface lithium to produce carbonate coatings sans the aforementioned swings in pH;

Eliminates the need for solvents, and particularly water as a solvent;

Eliminates the need for providing a humid environment;

Eliminates the need for pressurized systems and/or sealed atmospheres;

Eliminates the need for expensive equipment; and

Inexpensive and practical inasmuch as dry ice provides about 250 times more liters of $CO_2$ per U.S. dollar compared to the cost of gaseous $CO_2$ supplied in gas cylinders.

When carbon dioxide dissolves in water it exists in chemical equilibrium with carbonic acid. However, in the absence of water, the dissociation of gaseous carbonic acid has been predicted to be very slow, with a "half-life" of 180,000 years. This only applies if the molecules are few and far between, because it has also been predicted that gas-phase carbonic acid will catalyze its own decomposition by forming dimers, which then break apart into two molecules each of water and carbon dioxide.

The cryogenic conditions provided by the dry ice keeps the pure carbonic acid stable long enough until all of the dry ice is sublimated and its cooling effect is completely utilized. (This produces a low pH reaction environment.) This provides the cathode surface both $CO_2$ and $H_2O$ at the same time. Inasmuch as lithium can react with both water and carbon dioxide, the water dissolves lithium at the cathode surface. This dissolved lithium then reacts with $CO_2$ to form carbonates.

Via the invented dry ice treatment, a temporary protective layer of lithium carbonate is produced on the surface of cathode particles. $CO_2$ dissolves in condensed water vapor and gives carbonic acid (while dry ice sublimates, it condenses water vapor and/or may freeze water on the cathode's surface). This carbonic acid results in a local pH of approximately 5.5. All this may or may not under atmospheric conditions such that no controlled atmosphere is necessary.

The chemistry of these reactions is as follows:

$$CO_2 + H_2O \Leftrightarrow H_2CO_3 \rightarrow H^+ + HCO_3^-$$

$$HCO_3^- + H_2O \Leftrightarrow CO_3^{2-} + H_3O^+$$

$$H_2CO_3 \rightarrow H_2O \cdot CO_2 \rightarrow [CO_2(aq) + H_2O(l)]$$

$$H_2O \cdot CO_2 + H_2O \Leftrightarrow HCO_3^- + H_3O^+$$

Chemistries of possible surface lithium impurities and their reactions under the invented dry Ice/cathode protocol are as follows:

$$LiOH + CO_2 + H_2O \rightarrow LiHCO_3 + H_2O \rightarrow Li_2CO_3 + H_3O^+$$

$$Li_2CO_3 + CO_2 + H_2O \Leftrightarrow 2LiHCO_3$$

$$Li_2O + CO_2 + H_2O \rightarrow LiHCO_3 + LiOH \Leftrightarrow H\, Li_2CO_3 + H_2O$$

$$2LiHCO_3 + CO_2 + H_2O \rightarrow Li_2CO_3 + 2CO_3^{2-} + 4H^+$$

Reaction Environment
Detail

The method converts soluble lithium species on cathode particle surfaces to lithium carbonate using dry ice as the continuous $CO_2$ source. Unlike state of the art systems, the invented method is a surface conversion using solid state reactants. Specifically, solid carbon dioxide (dry ice) is mixed with cathode particles (e.g. $LiNiMnCoO_2$) to convert all soluble lithium species on the cathode surface to lithium carbonates. This is done through dry mixing (i.e., solid phase reactants only) such that no solvent is required. A myriad of atmospheres (ambient, sealed, or closed) can be utilized.

A common feature of the protocol in any atmosphere is that all or substantially all exterior cathode powder surfaces contact solid $CO_2$ during initial mixing. This is not to say that the entire exterior surface of the particle may be coated, but rather establishing fluid communication between dry ice and all aspects of the exterior creates a reaction surface (the cathode powder surface) for sublimated $CO_2$ to be in immediate fluid communication with condensed/frozen water on the particle surfaces. Also, this allows lithium from the cathode material to react with both water and carbon dioxide. Water enriches the lithium concentration on the cathode surface due to its dissolving power or solvation effect on lithium. This solvating occurs at a submicroscopic level given the amount of water and lithium involved. In other words, the solvent effect is not a typical bulk solvent add seen in the prior art protocols.) The dissolved lithium then reacts with $CO_2$ ($H_2CO_3 = CO_2 + H_2O$; carbonic acid) to form carbonates. Unlike the prior art protocols, the lithium moiety does not have an opportunity to as readily react with air to form LiOH. Thus, the pH provided by the instant method is kept relatively lower.

If the reaction chamber is evacuated prior to reaction, and subsequently allowed to develop a $CO_2$ partial pressure, due to sublimation, the reaction is further optimized. For example, as the dry ice sublimates it will create $CO_2$ pressure inside and eventually change its state to liquid $CO_2$. Mixing with liquid CO2 is optimal.

Since solid $CO_2$ has a surface temperature of $-78.5°$ C., under atmospheric conditions it draws atmospheric humidity and water vapor condensation occurs due to the cooling effect of $CO_2$. (Humidity levels of between approximately 1 percent and 100 percent are suitable.) This level of water condensation enriches the surface lithium species on the cathode surface while simultaneously sublimated $CO_2$ gas reacts with the lithium species. Surface conversion to $Li_2CO_3$ occurs. In light of the foregoing, just ambient humidity is required to supply any water necessary to facilitate the carbonate forming reaction. Water vapor may be added if desiccated or exceptionally dry atmospheres are required for other processes.

The invented method may be conducted at ambient humidity levels. Humidity values at least above 1 percent are suitable. Humidity values of 15 percent and above are preferred. Ambient temperatures can be utilized, with anything above about 0 C suitable. (Ambient temperature should be above the freezing point of water.)

When the dry ice condenses and freezes the atmospheric water vapor on the cathode particle surfaces, the ice then melts (i.e., when establishing equilibrium with ambient temperature) and dissolves the lithium on the cathode's surface. Simultaneously the dissolved lithium then reacts with $CO_2$ to form lithium carbonate (in the presence of water).

Aside from performing the process in atmospheric conditions, a sealed system may be utilized as follows: The vapor pressure of dry ice is 5.73 MPa (56.5 atm). So in closed systems where the ambient temperature is above the sublimation temperature ($-78.5°$ C.) of dry ice, this naturally creates high $CO_2$ vapor pressure which enables faster reactions between the condensed $H_2O$ with $CO_2$ gas. This also eliminates "the pressurized $CO_2$ gas application need" in atmosphere controlled equipment. Closed systems as envisioned herein prevent fluid communication between interior and exterior regions of the reaction vessel. Thus, the closed system allows for higher concentrations of $CO_2$ in the headspace of the reaction vessel. It is this gaseous $CO_2$ which reacts with ionic lithium to generate additional solid phase lithium carbonate on powder surfaces. Liquid carbon dioxide is also created in the sealed atmosphere paradigm. The partial pressure of the $CO_2$ gas may be controlled with a valve leading to exterior regions of the reaction chamber.

In summary of the mechanism of the sealed system, as the dry ice sublimates it will create $CO_2$ pressure inside and eventually change its state to liquid $CO_2$. Mixing with liquid $CO_2$ is optimal.

Alternatively, instead of using atmospheric conditions or a sealed atmosphere, a semi-closed or a closed system may be utilized. Generally, any $CO_2$ pressure generated in the semi-closed or closed system is lower than CO2's triple point. Above that triple point (518 kPa) $CO_2$ turns to a liquid in fully closed/sealed container. No liquid $CO_2$ would be generated in a semi-closed system even though pressures are raised within the buried mixture compared with the headspace of the reaction vessel. This pressure increase is temporary inasmuch as sublimation soon depresses the pressure. At this juncture, the $CO_2$ triple point is reached wherein solid, liquid and gaseous $CO_2$ are at equilibrium.

The semi-closed or closed system procedure is as follows: Cathode powder is mixed with dry ice powder. Then the mixture is placed within a larger bulk of pulverized dry ice so as to be substantially completely buried in the larger bulk. Water vapor from the head space of the reaction chamber and from air permeating the reaction chamber physically binds the dry ice, thereby sealing the surface of the bulk and isolating the mixture buried therein such that fluid communication between the mix and the atmosphere of the closed system is minimized or even eliminated. This results in the formation of a second sealed chamber within a first chamber. (The first chamber may be the actual reaction bulk dry ice container and may be sealed.) The effect of the formation of the second sealed chamber is that the mixture buried within it is exposed to a higher $CO_2$ partial pressure than pressures elsewhere within the first chamber or within the environment enveloping the second sealed chamber. A feature of this closed system is that only the outside surface of the $CO_2$ bulk is sealed such that fluid communication still occurs between structures within the bulk.

A preferable mixing temperature is 19° C. and above. The method may be conducted at atmospheric pressure, but if a closed reaction chamber is utilized, a positive $CO_2$ partial pressure may be obtained, as explained supra. This helps in the formation of the carbonate layer by assuring complete exposure of cathode particles.

Optionally, the coated construct may be subjected to additional treatment whereby the dry-ice treated cathode material is contacted with a carbonate, such as $H_2CO_3$, carbonated distilled water (wherein dry ice is first mixed with water), $CO_2$ gas purged water, sodium bicarbonate, and combinations thereof, to reduce the pH of the slurry. If this is done at the e-coat process then the pH of the solution would be equilibrated by lithium dissociation versus carbonic acid dissociation. If the temperature of the e-coat bath is increased to, for example 40° C., prior to the exposure of the dry ice treated cathode particles to the e-coat bath, then the lithium dissolutions decrease inasmuch as the solubility of lithium carbonate in water decreases with increasing temperature.

Conversely, $Li_2CO_3$ dissolves at a greater rate in relatively lower temperatures. (And cathode surfaces already contain $Li_2CO_3$ as an impurity.) At colder temperatures provided by dry ice, the lithium impurities are dissolving more in water vapor. The cryogenic conditions established by the invented process facilitate the formation and stability of $H_2CO_3$, at least until all of the dry ice evaporates. Thus, the conversion rate of the reaction is faster compared to the reaction rates in relatively warmer and more humid environments.

In summary of this point, the invented cryogenic reaction environment results in the bypass or even elimination of LiOH formation seen in state of the art protocols. Rather, $Li_2CO_3$ is generated at the surface sooner.

Coating Detail

Deposition should be even throughout the horizontal/vertical direction of the current collector. Unlike water based technologies, the invented method facilitates full/conformal/even coatings. State of the art protocols result in coatings that are patchy and spalling from the aluminum surface.

The coating obtained by the invented surface conversion method encapsulates the particle surface at a thickness varying between 1-10 nm depending on $CO_2$ amount used. The coating may or may not completely encapsulate the powder surface. A 1-10 nm conformal coating, preferably 1-6 nm, and more preferably 2-5 nm Li2CO3 coating can be generated.

Generally, between 80 percent and 100 percent of the cathode particle surface is covered with the final reaction product material. Typically NMC-type cathode materials comprise roughly ~6.5-8.5 weight percent lithium.

For example, the invented method enables the production of mg/cm$^2$ areal loadings, which is a standard (albeit relatively thick) coating for electric vehicle applications. A standard areal loading for electric vehicle applications electrochemical cycling tests at C/2 and/or C/3 rates requires 10 mg/cm$^2$ of cathode material loading on to aluminum. "C/2" and "C/3" designate the charge/discharge rate which is to say that if the specific capacity "C" of the cathode 200 mAh/g, then C/2 designates a 100 mA/g charging and discharging rate. C/2 or 0.5 C and C/3 or 0.33 C are optimum charging/discharging rates for vehicle operations. This example is provided as illustrative only such that the invention should not be relegated to the aforementioned areal loadings. Higher or lower areal loadings are also possible with the cathodes produced by the invented protocol.

Figure 2:
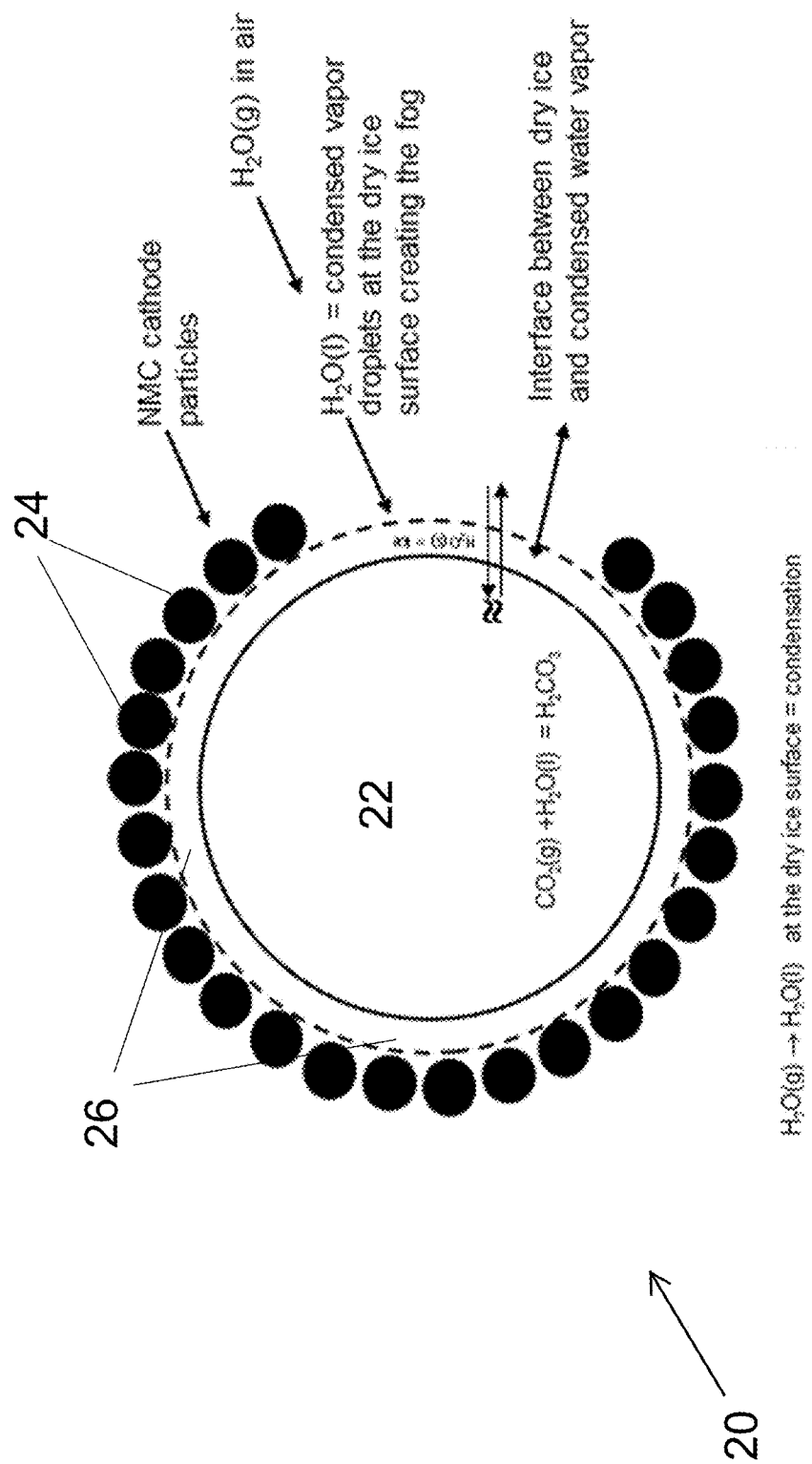
FIG. 2 is a schematic diagram of the interaction between dry ice and cathode particles, in accordance with features of the present invention.

FIG. 2 is a schematic diagram of the interaction between dry ice and cathode particles, that interaction designated generally as numeral 20. The stability of carbonic acid depends on the ambient temperature in which the solubility of $CO_2$(g) in water decreases with increasing temperature. Carbonic acid is a weak and unstable acid and decomposes to $CO_2$ and $H_2O$ upon heating, however with the use of dry ice 22, the local temperature on the cathode surfaces 24 is drastically reduced such that carbonic acid is formed in the presence of condensed water vapor 26. Since the hydration of $CO_2$ gas is slow due to a very thin layer of frozen-condensed-water vapor ($H_2O$-ice) on dry ice, by the time the $H_2O$-ice melts to equilibrate itself to the normal atmospheric temperature, it will dissolve more $CO_2$ from the dry ice and capture these $CO_2$ in $H_2O$ to form $H_2CO_3$. In other words, till the solid $CO_2$ (dry ice) sublimates, it will continuously condense atmospheric $H_2O$ while this $H_2O$ continuously reacts with $CO_2$ gas when the condensed-frozen $H_2O$-ice layer changes states between condensation-freezing-melting cycle.

This cycle is limited to the amount of dry ice till it sublimates completely. $CO_2$ gas, either dissolved in water or in the gas form, reacts with lithium-species on the cathode surface to form lithium (bi-)carbonates. The system naturally equilibrates itself by the simultaneous reactions of (1) sublimation of $CO_2$, and (2) by the condensation-freezing-melting of $H_2O$ molecules.

Mixing Detail

Solid $CO_2$ (dry ice) is homogeneously mixed with cathode powders. Dry ice readily evaporates at ambient temperatures. The cathode powders are combined with the dry ice at a cathode-to-dry ice weight ratio selected from between about 1:10 and about 1:20, and then heat treated at 400-450° C. with no air flow to the reaction chamber. Optionally, no gas is allowed to leave the reaction chamber so as to facilitate a build up of $CO_2$ partial pressures.

Optionally, a 1:1 or 1:2 mixing may occur first to visually confirm that the particles are stuck to the dry ice and get loosely agglomerated with the help of minimal water condensed. (This may take 1-2 minutes). Then the powders become frozen. This frozen mixture actually makes it easier to move or otherwise transfer that frozen mix without losing any before subsequently burying it in the second dry ice (half a slab or full slab).

Preferably, pretreatment (e.g., pulverization) of the dry ice occurs. The ratio of the first step mixing is 1:1 or 1:2 with pulverized dry ice. Pulverization creates high surface area of the dry ice which translates to high amount/volume of water condensation can be obtained. Afterwards, the rest of the full slab (~1-1.2 kg) may be pulverized. These pulverization pretreatment steps allow the dry ice to capture more water, such that when the first mix (e.g., the 1:1 to 1:2 ratio mix)

is established, the pulverized dry ices adhered to each other again with the help of condensed thin water layer, isolating the mix from outside. The water captured in between the adhered dry ice particles also continuously sustained an amount of water till all the dry ice sublimated.

The pH between the three interfaces (solid dry ice and cathode surface and water vapor) at the time of mixing is reduced by $H_2CO_3$ formation, first and then balanced with the lithium dissolution and carbonate conversion.

A first cathode:dry ice mix ratio (by weight) is 1:1 or 1:2 is established (for a couple of minutes to allow the atmospheric water to react with the dry ice and cathode) and then bury this mix in to a 1:20 (cathode:dry ice) mix and immediately put it in furnace (skipping any vacuum drying overnight). As discussed elsewhere herein, $CO_2$ gas coming out from the outer surface of the dry ice mountain may not react with the cathode powders buried inside. Rather, the sublimation of $CO_2$ gas creates a $CO_2$ atmosphere inside the furnace (1 slab ~=1 kg of solid $CO_2$=~540-560 liters $CO_2$ gas @ 27° C., 1 atm).

In summary of the mixing protocol, cathode powders are mixed with pulverized dry ice thoroughly (cathode-dry ice weight ratio: 1:2) to create a mixture. After thorough mixing, the cathode particles are buried in additional dry ice such that total dry ice weight is at least 10 times the weight of cathode particles. Temperature at mixing was approximately 20° C. Humidity ranged from between about 20 percent and 30 percent.

Heat Treatment

Detail

The mixture is heated to between about 250 and 700° C. A preferred range is from 300 to 500° C. and a most preferred range is from 400 to 450° C. Generally, a temperature is selected to remove water while staying below the melting of the lithium carbonate coating (732° C.). Heat application occurs under $CO_2$ environment. Once the mixture is buried in dry ice, it is inserted into a furnace to create the $CO_2$ environment. Preferably, heat is applied to remove any excess water or structural water that might reside in the structure. This assures the minimization of formation of intermediate phase LiOH (the aforementioned first phase in state of the art systems).

A temperature is selected along with the $CO_2$ flux to decompose the LiOH where it reacts with $CO_2$. Heating is for establishing primarily a single phase $CO_2$ treatment protocol. The invented protocol provides a single phase reaction sequence primarily due to continuous $CO_2$ sublimation, such that no LiOH should remain. Due to formation of some water vapor, some intermediate LiOH may linger on the surface, thereby resulting in the presence of two phases. The heat treatment quickly destroys water on the surface, therefore minimizing formation of LiOH, while simultaneously facilitating formation of $Li_2CO_3$.

For example, the mixture/dry ice encapsulating layer is heat-treated at between about 400° C. and 450° C. to convert surface soluble lithium species into a conformal lithium carbonate layer encapsulating the cathode material. (However, and as noted supra, the layer may or may not encapsulate the entire cathode powder particle. For example, less than 1 percent of a cathode powder's grain surface may be covered with a carbonate layer.)

A myriad of heating times are suitable, ranging from 1 to 8 hours, and preferably 1-3 hours. Heating times depend on the amount of heat applied. For example, at 400° C., approximately 3 hours may be required.

The inventors found that the amount of lithium leaching from cathodes produced by their invented method of $CO_2$ treatment is similar to the leaching from pristine material. (This compares to lithium carbonate coated cathodes produced via prior art protocols wherein at least 5 times more lithium leaching occurs compared to pristine cathode material.)

When the produced cathode surface is converted to $Li_2CO_3$ and then exposed to water, it reduces the pH of the slurry due to forming carbonic acid at the cathode/water interface. As such, slightly lower (e.g., below pH 11) and therefore more advantageous pH values were obtained with the invented method. Generally, a pH of between 6 and 11 are established. No additional lithium is added to the cathode, rather, only lithium already present on the cathode material is utilized.

Generally, cathode materials are comprised of lithium, manganese, nickel, cobalt, and oxygen. For example, exemplary cathode powers are an NMC type cathode material selected from the group consisting of nickel, cobalt, manganese, lithium, oxygen, and combinations thereof. Exemplary cathode substrates include NMC 111, NMC 523, NCM 622, NMC811, and combinations thereof, and can be produced in the laboratory or purchased commercially, for example from 3M (Minneapolis, Minn.), Umicore (Maxton, N.C.), Targray (Kirkland Quebec), and MTI (Auburn, Ind.). The numbers after the "NMC" designations are molar ratios, such that NCM 622 is $LiNi_{0.6}Co_{0.2}Mn_{0.2}O_2$.

To make cathode materials, $Ni_xMn_yCo_z(OH)_2$ (NMC-hydroxide precursor) are mixed with $LiOH.H2O$ (dry mixing) and then this mixture is calcined at 780-1000° C. to synthesize $Li_a Ni_xMn_yCo_zO_2$ (solid state synthesis)(0<x,y, z<1.0). Lithium atoms reside between the layers of metal atoms (metal oxide layers). However on the surface, its chemistry changes due to the air, humid, temperature (ambient environment).

Almost all NMC cathode particles have surface lithium impurities. (Lithium impurities include $Li_2O$, LiOH, $LiHCO_3$, $Li_2CO_3$ and combinations thereof.) As such, only surface soluble lithium species are converted to $Li_2CO_3$.

Transition metal dissolutions are shown in Table 1 below:

Elemental dissolutions per weight of cathode material exposed to water:

Pristine, $Li_2CO_3$ coated and $CO_2$ treated NCM523 (commercial material)

| | Weight % of element dissolution per weight of cathode | | |
|---|---|---|---|
| Elements | Pristine (uncoated) | $Li_2CO_3$ coated (Prior Art) | $CO_2$ treated (Invented Method) |
| Li | 0.1046% | 0.579% | 0.1052% |
| Mn | 0.0011% | 0.0001% | 0.0004% |
| Ni | 0.0054% | — | 0.0008% |
| Co | 0.0008% | — | 0.0002% |

Table 2 below relates to a commercial NCM111 non-working material. This material after dry ice treatment became compatible with the e-coat process. And the treated powders were evenly electrodeposited on aluminum current collector in the e-coat bath and the resultant cathode electrode was cycled in a battery.

Table 2 relates to direct heat treatment, whereas the data in Table 1 resulted from vacuum drying overnight.

Table 2 shows that the effect of elemental dissolutions are superior for NCM111 compared to NCM523:

| Elements | Weight % of element dissolution per weight of cathode | | |
|---|---|---|---|
| | Pristine (uncoated) | $Li_2CO_3$ coated (Prior Art) | $CO_2$ treated (Invented Method) |
| Li | 0.0683% | 0.9492% | 0.0650% |
| Mn | 0.0013% | — | — |
| Ni | 0.0028% | — | — |
| Co | 0.0009% | — | — |

A standard water exposure test on treated cathode particles was conducted to monitor the resulting pHs of the cathode/water mixture as a function of time. The water exposure test includes exposing 2 weight percent of cathode particles to 98 weight percent of deionized water for 48 hours under gentle stirring.

Dry ice treatment of cathodes reduced the pH and conductivity of the e-coat bath formulation which enabled efficient e-coat kinetics. $CO_2$— treated cathodes tested in an e-coat process showed better adherence to the aluminum current collector with desirable loading densities achieved compared to pristine (un-treated) counterparts. As discussed supra, water-based surface treatments negatively affected the e-coat deposition kinetics and did not provide sufficient loading densities.

In summary, the invented protocol includes mixing cathode particles with dry ice and following by a mild heat treatment.

The first 4 steps of this calcination protocol is fixed for normal calcination. After holding at step (4) for allocated time (2-10 hours), the furnace is shut down for naturally cooling (7). Steps 5 and 6 which include CO2 purging to the system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, when graphite is mixed (for example via a high shear ball milling mixing method) with dry ice, it creates graphene nano sheets. The inventors envision including carbon black into this mixture to increase electronic conductivity within the cathode particles while providing a graphene/carbonate surface at the same time and mitigating elemental dissolutions by a carbonate layer. This will increase electronic conductivity of cathode particles by a graphene layer: for example; cathode, carbon black and dry ice all mixed together and heat treated at a low temperature.

Furthermore, the inventors envision adding fluorine additives to create a surface F-doping. This will form a thin LiF component to the surface structure. (LiF is known to be stable in water.) If multi-layer protective interfaces are incorporated on the cathode surfaces which all allow lithium transportation in and out from the cathode upon cycling, this will enhance water stability without trading off from the cathode capacity.

While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for producing water resistant cathodes, the method comprising:
    a) contacting solid phase cathode powder containing lithium with solid phase carbon dioxide to create a mixture wherein a weight ratio of the powder to the carbon dioxide is between 1:10 and 1:20; and
    b) heating the mixture to a temperature between 250 and 700° C. and for between 1 and 8 hours to cause a conformal coating of lithium carbonate to form on the powder.

2. The method as recited in claim 1 wherein the method is conducted in atmospheric conditions.

3. The method as recited in claim 1 wherein the mixture is heated to between 300 and 500° C.

4. The method as recited in claim 1 wherein the powder is an NMC type cathode material selected from the group consisting of nickel, cobalt, manganese, lithium, oxygen, and combinations thereof.

5. A method for producing water resistant cathodes, the method comprising:
    a) mixing cathode powder containing lithium with solid carbon dioxide to create a mixture; and
    b) heating the mixture to a temperature between 250 and 700° C. and for a time between 1 and 8 hours to cause lithium carbonate to form on the powder, wherein mixing occurs in an atmosphere having between 1 percent and 30 percent humidity.

6. The method as recited in claim 5 wherein the mixing establishes an equilibrium between solid dry ice and gaseous water to form carbonic acid.

7. The method as recited in claim 6 wherein the carbonic acid reacts with lithium contained in the powder.

8. The method as recited in claim 7 wherein the reaction occurs at between −30° C. and 0° C.

9. A method for producing water resistant cathodes, the method comprising:
  a) mixing cathode powder containing lithium with solid carbon dioxide to create a mixture; and
  b) heating the mixture to a temperature between 250 and 700° C. and for a time between 1 and 8 hours to cause lithium carbonate to form on the powder wherein the mixture is buried under additional solid carbon dioxide before heating.

10. A method for coating lithium-containing solid cathode surfaces, the method comprising:
  a) simultaneously sublimating solid $CO_2$ and condensing atmospheric water vapor onto the surfaces; and
  b) allowing the lithium to react with the sublimated $CO_2$ for a time between 1 to 8 hours to create a lithium carbonate film on the surface.

11. The method as recited in claim 10 wherein a pH of the surface is less than 11.

12. The method as recited in claim 10 wherein the simultaneous step comprises mixing solid dry ice with cathode powder.

13. The method as recited in claim 10 wherein a weight ratio of dry ice to cathode powder ranges from 10:1 to 20:1.

14. A method for coating lithium-containing cathode surfaces, the method comprising:
  a) simultaneously sublimating solid $CO_2$ and condensing atmospheric water vapor onto the surfaces; and
  b) allowing the lithium to react with the sublimated $CO_2$ for a time between 1 to 8 hours to create a lithium carbonate film on the surface, and further comprising removing excess water from the surface.

15. The method as recited in claim 10 further comprising heating the film.

16. The method as recited in claim 11 wherein the simultaneous step results in the production of carbonic acid.

17. The method as recited in claim 16 wherein the carbonic acid reacts with the lithium.

18. The method as recited in claim 10 wherein the condensed water dissolves the lithium prior to the creation of the film.

* * * * *